United States Patent Office 3,766,091
Patented Oct. 16, 1973

3,766,091
MODIFIED ORGANOMAGNESIUM CATALYST
COMPOSITIONS
Edwin J. Vandenberg, Foulk Woods, Wilmington, Del.,
assignor to Hercules Incorporated, Wilmington, Del.
No Drawing. Continuation-in-part of application Ser. No.
5,149, Jan. 22, 1970, which is a continuation-in-part of
application Ser. No. 694,374, Dec. 29, 1967, both now
abandoned, which in turn is a continuation-in-part of
application Ser. No. 18,888, Mar. 31, 1960, now Patent
No. 3,415,761. This application Oct. 19, 1971, Ser.
No. 190,688
Int. Cl. C07f 3/02; C08g 23/14
U.S. Cl. 252—431 R                              8 Claims

ABSTRACT OF THE DISCLOSURE

Certain modified organomagnesium compounds have been discovered, which are particularly useful as polymerization catalysts. These new catalyst compositions comprise the reaction product of an organomagnesium compound such as a dialkylmagnesium with water, a polyol or a polyhydric phenol admixed with an inert organic diluent and/or a complexing agent for the modified organomagnesium compound.

This is a continuation-in-part of my copending application Ser. No. 5,149, filed Jan. 22, 1970, which is now abandoned and is in turn a continuation-in-part of my application Ser. No. 694,374, filed Dec. 29, 1967, and now abandoned, which is in turn a continuation-in-part of my application Ser. No. 18,888, filed Mar. 31, 1960, now U.S. Patent No. 3,415,761.

This invention relates to catalyst compositions comprising modified organomagnesium compounds. More particularly, this invention relates to halogen-free organomagnesium compounds modified by reaction in a liquid diluent with water, a polyol or a polyhydric phenol.

Halogen-free organomagnesium compounds are known in the art as catalysts in the polymerization of epoxides as shown in U.S. Patent No. 2,870,100. However, the use of unmodified organomagnesium as catalysts results in low yields of relatively low molecular weight polymers.

In my earlier filed application Ser. No. 18,888 there are described halogen-free organomagnesium compounds that have been modified by reaction in a liquid diluent with at least one polyreactive compound. When these modified compounds are used in the polymerization of epoxides, they greatly increase the rate of polymerization and yield. In addition, their use results in much higher molecular weight polymers which in some cases are more stereoregular. The amount of the total polyreactive compound that is reacted with the organomagnesium compound is critical and should be an equivalent mole ratio within the range of from about 0.01 to about 0.7 and preferably from about 0.05 to about 0.5, of the polyreactive compound to the organomagnesium compound. By the term "equivalent mole ratio" as used in this specification and claims is meant the moles of polyreactive compound containing two reactive sites per equivalent of magnesium compound.

Any organomagnesium compound, which contains at least one magnesium-carbon bond and no halogen, when reacted with the above-mentioned polyreactive compounds can be used in the preparation of the catalyst compositions of this invention. Preferably the organomagnesium compound will have the formula RR'Mg where R is any hydrocarbon radical, as for example, alkyl, alkenyl, cycloalkyl, cycloalkenyl, aryl, alkaryl, cycloalkyl aryl, etc., and R' is the same as R or is H, or —OR. Exempary of the organomagnesium compounds that can be used in the preparation of the catalyst compositions of this invention are dimethylmagnesium,
diethylmagnesium,
dipropylmagnesium,
diisopropylmagnesium,
di-n-butylmagnesium,
diisobutylmagnesium,
di-(tert-butyl)-magnesium,
diamylmagnesium,
dioctylmagnesium,
dicyclohexylmagnesium,
diphenylmagnesium,
ethylmagnesium hydride,
butylmagnesium hydride,
methoxy methylmagnesium,
ethoxy ethylmagnesium,
magnesacyclonona-3,7-diene, etc.

Various methods of preparing these compounds are known in the art. For example, one well known method of preparing diorganomagnesium compounds is to add dioxane to an ether solution of a Grignard reagent. The dioxane precipitates magnesium dihalide leaving the diorganomagnesium compound in solution. Another method is by the reaction of magnesium with a diene to form a cyclic organomagnesium compound. This latter reaction can be shown as follows:

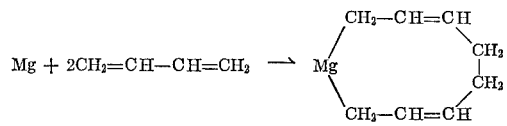

As pointed out above, the organomagnesium compound is reacted with a polyreactive compound selected from the group consisting of water, polyols and polyhydric phenols to form the modified organomagnesium compound. By the term "polyreactive compound" is meant a compound which has at least two sites for reaction with the organomagnesium compound. Thus, the polyreactive compounds of this invention contain at least two active hydrogens, i.e., hydrogen attached to oxygen as is present in —OH groups and water.

As stated above, the compounds that can be used as the polyreactive compound for the reaction with the organomagnesium compound to form the modified compounds of this invention are water, polyols and polyhydric phenols. The polyols are non-aromatic and include the alkylene glycols, acylic polyols and cycloaliphatic hydrocarbon polyols. Suitable alkylene glycols will have the general formua

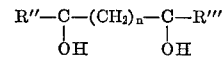

where R" and R'" can be hydrogen or alkyl and alike or different and n is 0 or an integer. Exemplary of the alkylene glycols, acyclic polyols and cycloaliphatic hydrocarbon polyols that can be used are ethylene glycol, trimethylene glycol, tetramethylene glycol, pentamethylene glycol, glycerol, pentaerythritol, trimethylol propane, 2-butene-1,4-diol, 2-butyne-1,4-diol, 1,3-cyclohexanediol, 1,4-cyclohexanediol, etc. Exemplary of the polyhydric phenols that can be used are resorcinol, hydroquinone, pyrocatechol, bisphenol A (p,p'-isopropylidenediphenol) and the like.

The exact structure of the modified organomagnesium compound of this invention is not known. It is believed that a reaction takes place whereby a portion of the hydrocarbon group attached to the magnesium is replaced with another group, the latter depending upon the polyreactive compound used. It is believed that the modified organomagnesium compound consists of at least two organomagnesium groups joined together by the polyreactive compound. Thus, if the polyreactive compound is difunctional, the modified organomagnesium compound would have the formula

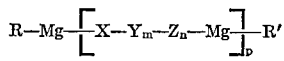

where R is a hydrocarbon group, R' is R, H or —OR, X and Z are oxygen, Y is a divalent moiety derived from the polyreactive compound, $m$ is 0 or 1, $n$ is 0 or 1, and $p$ is 1 or more. If the polyreactive compound contains three or more reactive sites, then one obtains highly branched structures, as for example,

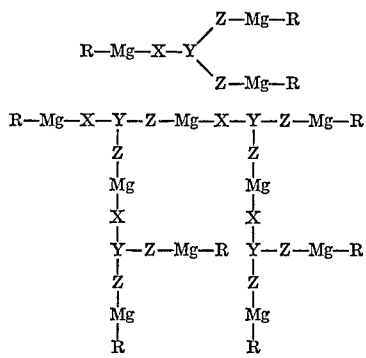

Regardless of what the theory of the reaction may be, it is essential that the product of this invention retain magnesium to carbon bonds in an amount of from about 0.2 to about 1.8 carbon bonds per magnesium atom, and preferably from about 0.4 to about 1.2.

The amount of the polyreactive compound that is reacted with the organomagnesium compound will depend primarily on the specific polyreactive and organomagnesium compounds being reacted. In any event, it should be within the range of from about 0.01 to about 0.7 mole per mole equivalent of magnesium compound, preferably from about 0.05 to about 0.6 and more preferably from about 0.1 to about 0.4 based on a difunctional reactive compound. Thus in the case of a difunctional polyreactive compound such as water, one would use from about 0.02 to about 1.4 moles of water per mole of organomagnesium compound and preferably from about 0.1 to about 1.2 mole of water per mole of magnesium, etc. If the polyreactive compound contains more than two reactive sites, the amount of polyreactive compound will be reduced proportionately. In the case of magnesium compound having the formula MgRR' where R is hydrocarbon and R' is OR, the ratio of polyreactive compound will be lower, as for example, in the range of from about 0.01 to about 0.35 mole equivalent.

Any desired procedure can be used for reacting the organomagnesium compound with the specified ratio of the polyreactive compound. Thus the organomagnesium compound and the polyreactive compound can be reacted by adding the specified amount of polyreactive compound to a solution or dispersion of the organomagnesium compound in an inert diluent, as for example, a hydrocarbon diluent such as n-hexane, n-heptane, branched aliphatic hydrocarbons, aromatic hydrocarbons, such as benzene, toluene, etc., cycloaliphatic hydrocarbons, such as cyclohexane, methylcyclohexane, etc., or a mixture of such diluents. Preferably, the reaction will be carried out under an inert atmosphere, as for example, nitrogen, helium, argon, methane, ethane, etc. In general the reaction can be carried out at any temperature, as for example, from about —50° C. to about 200° C.

As another modification of this invention, it may be desirable in some cases to react the modified organomagnesium compounds with a complexing agent. Exemplary complexing agents are ethers, thioethers, aminoethers, tertiary amines, tertiary phosphines, etc. Preferred complexing agents include the aliphatic, aromatic, cycloaliphatic and araliphatic simple or mixed ethers, the non-aromatic tertiary amines, the mixed aliphatic-aromatic tertiary amines, the monohydroxy aliphatic tertiary amines and the mixed ether-amines. Exemplary of the ether complexing agents are the dialkyl ethers wherein the alkyl group contains from 1 to 20 carbon atoms, and particularly diethyl ether, diisopropyl ether, dibutyl ether and methylbutyl ether; diaryl ethers such as diphenyl ether; arylalkyl ethers such as phenylmethyl ether; cycloaliphatic mixed ethers such as cyclohexylmethyl ether; cyclic ethers such as dioxane, tetrahydrofuran, N-methylmorpholine, tetrahydrofurfuryl alcohol, etc.; unsaturated ethers such as vinyl ethyl ether, vinyl butyl ether, vinyl propyl ether, vinyl amyl ether, vinyl cyclohexyl ether, vinyl phenyl ether, vinyl tolyl ether, isopropenyl ethyl ether, isopropenyl isopropyl ether, isopropenyl butyl ether, isopropenyl phenyl ether, isopropenyl amyl ether, isobutenyl ethyl ether, allyl methyl ether, allyl ethyl ether, allylpropyl ether, butenyl ethyl ether, butenyl propyl ether, pentenyl amyl ether, vinyl cyclohexyl ether, vinyl cyclopentyl ether, para-vinyl anisole, allyl benzyl ether, viny benzyl ether, vinyl phenethyl ether, isopropenyl phenethyl ether, etc. as well as corresponding dialkenyl ethers such as divinyl ether, diallyl ether, etc. Exemplary of the tertiary amine complexing agents are the trialkylmonamines, the N,N, N',N'-tetraalkyl alkylene diamines, the N,N,N',N'-tetraalkyl diaminocycloalkanes, the dialkylamino alkanols; the dialkylphenylamines, and the tetraalkylphenylenediamines (o, m or p). Particularly preferred tertiary amine complexing agents include triethylamine, 3-diethylaminopropanol-1, diethylaniline, endoethylene piperazine, N-methyl piperidine, N,N,N',N'-tetraethylethylenediamine, N,N,N',N'-tetraethyldiaminocyclohexane. These modified and complexed compounds can be prepared by reacting the organomagnesium compound first with the polyreactive compound and then with the complexing agent or the complexing agent can be added during the reaction of the organomagnesium compound with the polyreactive compound. In the case of weak complexing agents such as diethyl ether, the complexing agent may be used as a diluent for the reaction between the organomagnesium compound and the polyreactive compound. The amount of complexing agent employed will vary widely depending upon the nature of the complexing agent. Thus, with weak complexing agents such as diethyl ether and dioxane, one can use from 0.1 up to 100 or more moles per magnesium atom and with stronger complexing agents such as tertiary amines, phosphines, some cyclic ethers, etc., an amount of from about 0.1 to about 10 moles, preferably from about 1 to about 3 moles per magnesium atom can be used.

The catalyst compositions of this invention can be employed as catalysts in various polymerization processes. For example, they are excellent catalysts in the polymerization of epoxides. They are also excellent catalysts in the polymerization of cyclic organophosphorus monomers to organic phosphorus polymers.

The following examples are presented to illustrate the modified organomagnesium compounds of this invention. All parts and percentages are by weight unless otherwise indicated. To demonstrate the unique properties of the compounds of this invention when used as catalysts, the polymerization of certain epoxides is shown in the examples. The molecular weight of the polymers produced in those examples is shown by the reduced specific viscosity (RSV) given for each. By the term "reduced specific viscosity" is meant the $\eta$ sp./c. determined on a 0.1% solution of the polymer in a given diluent. In the case of polyethylene oxide, the RSV is determined in chloroform at 25° C., and in the case of polypropylene oxide the RSV is determined in benzene at 25° C. Hence, in the citation of the RSV, the diluent, and temperature at which the RSV is determined are stipulated.

EXAMPLE 1

This example shows the preparation of catalyst compositions comprising resorcinol modified diethyl magnesium complexed with diethyl ether. Various samples having different mole ratios of resorcinol to diethyl magnesium were prepared.

In each case, 0.33 part of diethyl magnesium was dissolved in diethyl ether in the presence of glass beads to make up a 0.5 M solution. While maintaining the solution at a temperature of 30° C. under an atmosphere of nitrogen the required amount of resorcinol equal to the mole ratio recited in Table I was added with agitation. In each case the reaction mixture was then agitated for 20 hours while holding the temperature at 30° C. The resulting samples were tested for activity in polymerizing ethylene oxide.

In each case a polymerization vessel filled with nitrogen was charged with 28.8 parts of n-heptane and 10 parts of ethylene oxide. After equilibrating the vessel and contents at 30° C. the sample of resorcinol modified diethyl magnesium in the diethyl ether was added. The polymerization reaction mixture was agitated at 30° C. for 19 hours.

The ether-insoluble polyethylene oxide produced was isolated by adding excess ether to the reaction mixture. In Table I is set forth the total percent conversion to polymer in each case, together with the amount of isolated polymer produced in each case, indicated as percent conversion to isolated polymer and percent of the total polymer, and the RSV of the polymer. Also tabulated is the ether-soluble polymer produced. A control polymerization was run using unmodified diethyl magnesium.

TABLE I

| | Mole ratio of resorcinol to diethyl magnesium | Total percent conversion | Isolated polymer | | | Ether-soluble polymer, percent conversion |
|---|---|---|---|---|---|---|
| | | | Percent conversion | RSV | Percent of total | |
| Example: | | | | | | |
| 1a | 0.03 | 38 | 38 | 118 | 100 | 0 |
| 1b | 0.1 | 79 | 79 | 107 | 100 | 0 |
| 1c | 0.3 | 98 | 98 | 34 | 100 | 0 |
| 1d | 0.5 | 96 | 96 | 32 | 100 | 0 |
| 1e | 0.75 | 50 | 47 | 7.8 | 94 | 3 |
| Control | (1) | 4 | 2.1 | 49 | 50 | 2 |

1 No resorcinol.

EXAMPLE 2

A resorcinol modified diethyl magnesium was prepared as described in Example 1 except n-heptane was used as the solvent instead of diethyl ether. The mole ratio of resorcinol to diethyl magnesium was 0.3. The resulting product was used to catalyze the polymerization of ethylene oxide as described in Example 1. The total percent conversion to polymer was 91. The percent conversion of isolated polymer was 91. The isolated polymer represented 100% of the total and the polymer had an RSV of 41.

EXAMPLES 3–8

These examples show the preparation of catalyst compositions comprising various modified diethyl magnesium compounds complexed with diethyl ether. In each case, 0.33 part of diethyl magnesium was dissolved in diethyl ether in the presence of glass beads to make up a 0.5 M solution. While maintaining the solution at a temperature of 30° C. under an atmosphere of nitrogen an amount of the polyreactive compound equal to the mole ratio recited in Table II was added with agitation. The reaction mixture was then agitated for 20 hours while holding the temperature at 30° C. The resulting modified and complexed compounds were tested for activity in polymerizing ethylene oxide as described in Example 1. In Table II is set forth the polyreactive compound used, together with total percent conversion, and the conversion to ether-insoluble polymer and ether-soluble polymer and the RSV of the ether-insoluble polymer.

TABLE II

| | Mole ratio of polyreactive compound to diethyl magnesium | Polyreactive compound | Total percent conversion | Isolated polymer | | | Ether-soluble polymer, percent conversion |
|---|---|---|---|---|---|---|---|
| | | | | Percent conversion | RSV | Percent of total | |
| Example: | | | | | | | |
| 3 | 0.5 | Water | 30 | 29 | 178 | 97 | 1 |
| 4 | 0.5 | Ethylene glycol | 36 | 36 | 39 | 100 | 0 |
| 5 | 0.5 | Trimethylene glycol | 84 | 84 | 43 | 100 | |
| 6 | 0.5 | Hydroquinone | 94 | 94 | 20 | 100 | 0 |
| 7 | 0.5 | Pyrocatechol | 94 | 94 | 18 | 100 | 0 |
| 8 | 0.5 | Bisphenol A | 72 | 72 | 41 | 100 | 0 |
| Control | | No polyreactive compound | 4 | 2.1 | 49 | 50 | 2 |

EXAMPLE 9

This example shows the preparation of a catalyst composition comprising a resorcinol modified diisopropyl magnesium compound complexed with diethyl ether. In this example, 0.44 part of diisopropyl magnesium was dissolved in diethyl ether in the presence of glass beads to make up a 0.5 M solution. While maintaining the solution at a temperature of 30° C. under an atmosphere of nitrogen an amount of resorcinol equal to a mole ratio of resorcinol to diisopropyl magnesium of 0.3 was added with agitation. The reaction mixture was then agitated for 20 hours while holding the temperature at 30° C. The resulting modified and complexed compound was tested for activity in polymerizing ethylene oxide as described in Example 1. In Table III is set forth the total percent conversion, and the conversion to ether-insoluble polymer and ether-soluble polymer and the RSV of the ether-insoluble polymer.

TABLE III

| | Total percent conversion | Isolated polymer | | | Ether-soluble polymer, percent conversion |
|---|---|---|---|---|---|
| | | Percent conversion | RSV | Percent of total | |
| Example | 94 | 94 | 103 | 100 | 0 |
| Control (No resorcinol) | 3 | 3 | 43 | 100 | 0 |

EXAMPLE 10

A resorcinol modified di-tert-butyl magnesium complexed with diethyl ether was prepared by the procedure described in Example 9, except 0.55 part of the magnesium compound was used. The resulting product was tested for activity in polymerizing ethylene oxide as described in Example 1. In Table IV is set forth the total percent conversion, and the conversion to ether-insoluble polymer and ether-soluble polymer and the RSV of the ether-insoluble polymer.

TABLE IV

| | Mole ratio of resorcinol to di-tert-butyl magnesium | Total percent conversion | Isolated polymer | | | Ether soluble polymer, percent conversion |
|---|---|---|---|---|---|---|
| | | | Percent conversion | RSV | Percent of total | |
| Example 10 | 0.3 | 84 | 84 | 27 | 100 | 0 |
| Control | (1) | 3 | 3 | 75 | 100 | 0 |

[1] No resorcinol.

EXAMPLE 11

A resorcinol modified diphenyl magnesium complexed with diethyl ether was prepared by the procedure described in Example 9, except 0.71 part of the magnesium compound was used. The resulting product was tested for activity in polymerizing ethylene oxide as described in Example 1. In Table V is set forth the total percent conversion, and the conversion to ether-insoluble polymer and ether-soluble polymer and the RSV of the ether-insoluble polymer.

TABLE V

| | Mole ratio of resorcinol to di-tert-butyl magnesium | Total percent conversion | Isolated polymer | | | Ether soluble polymer, percent conversion |
|---|---|---|---|---|---|---|
| | | | Percent conversion | RSV | Percent of total | |
| Example 11 | 0.3 | 7 | 80 | 80 | 24 | 100 |
| Control | (1) | 6 | 6 | 10.1 | 100 | 0 |

[1] No resorcinol.

EXAMPLES 12–15

Various modified and complexed diethyl magnesium compounds were prepared by reacting diethyl magnesium with more than one polyreactive compound and/or more than one complexing agent. The procedure followed was the same as described in Example 1. Where more than one polyreactive compound was used the reaction mixture was agitated for 20 hours at 30° C. between each addition.

Thus, in Example 12 the diethyl magnesium was reacted first with ethanol and then with resorcinol, agitating for 20 hours at 30° C. between each addition. In Example 13, it was reacted with dioxane (a complexing agent) and then with resorcinol. In Example 14, it was reacted with water and then 3-diethylaminopropanol-1 (a complexing agent that in addition contained one active hydrogen). In Example 15, it was reacted with water and triethylamine (a complexing agent).

Gas analysis of the product of Example 15h showed it to contain only 0.3 ethyl group per magnesium.

The resulting products were tested for activity in polymerizing ethylene oxide as described in Example 1. In Table VI are tabulated the data for each of these runs.

TABLE VI

| Example: | Mole ratio of polyreactive compound or complexing agent to diethyl magnesium | Reactant | Percent total conversion | Isolated polymer | | | Ether-soluble polymer, percent conversion |
|---|---|---|---|---|---|---|---|
| | | | | Percent conversion | RSV | Percent of total | |
| 12a | 1.0 | Ethanol | 1 | 1 | 13 | | 0 |
| 12b | 1.0 / 0.3 | Ethanol / Resorcinol | 80 | 80 | 50 | 100 | 0 |
| 13a | 0.27 | Dioxane | 3 | 3 | 44 | 100 | 0 |
| 13b | 0.27 / 0.3 | Dioxane / Resorcinol | 93 | 93 | 80 | 100 | 0 |
| 13c | 0.27 / 0.25 | Dioxane / Water | 72 | 72 | 121 | 100 | 0 |
| 14a | 0.7 / 0.1 | 3-diethylamino propanol-1 / Water | 46 | 46 | 407 | 100 | 0 |
| 14b | 0.25 | Water | 11 | 11 | 142 | 100 | 0 |
| 14c | 0.25 / 0.7 | Water / 3-diethylamino propanol-1 | 50 | 50 | 248 | 100 | 0 |
| 14d | 0.25 / 1.0 | Water / 3-diethylamino propanol-1 | 65 | 29 | 320 | 45 | 36 |
| 14e | 0.5 / 0.7 | Water / 3-diethylamino propanol-1 | 55 | 45 | 784 | 82 | 10 |
| 14f | 0.8 | Water | 21 | 21 | 103 | 100 | 0 |
| 14g | 0.8 / 0.7 | Water / 3-diethylamino propanol-1 | 56 | 30 | 212 | 54 | 26 |
| 15a | 0.1 / 1.0 | Water / $(C_2H_5)_3N$ | 22 | 22 | 67 | 100 | 0 |
| 15b | 0.5 / 1.0 | Water / $(C_2H_5)_3N$ | 55 | 39 | 538 | 71 | 16 |
| 15c | 0.8 | Water | 21 | 21 | 103 | 100 | 0 |
| 15d | 0.8 / 1.0 | Water / $(C_2H_5)_3N$ | 64 | 53 | 200 | 83 | 11 |
| 15e | 1.0 | Water | 34 | 34 | 160 | 100 | 0 |
| 15f | 1.0 / 1.0 | Water / $(C_2H_5)_3N$ | 72 | 69 | 395 | 96 | 3 |
| 15g | 1.0 / 2.0 | Water / $(C_2H_5)_3N$ | 71 | 65 | 623 | 92 | 6 |
| 15h | 1.2 | Water | 42 | 42 | 44 | 100 | 0 |
| 15i | 1.2 / 1.0 | Water / $(C_2H_5)_3N$ | 77 | 76 | 477 | 99 | 1 |

EXAMPLE 16

This example illustrates the use of a modified diethyl magnesium in the copolymerization of propylene oxide with allyl glycidyl ether. The resorcinol modified diethyl magnesium complexed with diethyl ether was prepared as described in Example 1c. In this example 0.66 part of diethyl magnesium in 12.1 parts of diethyl ether was maintained at 30° C. under an atmosphere of nitrogen. To this solution 0.3 mole of resorcinol per mole of magnesium was added with agitation. The reaction mixture was then agitated for 20 hours while holding the temperature at 30° C. A polymerization vessel filled with nitrogen was charged with 20.8 parts of n-heptane, 18 parts of propylene oxide and 2 parts of allyl glycidyl ether. After equilibrating the vessel and contents at 30° C., the sample of resorcinol modified diethyl magnesium in the diethyl ether was added. The polymerization reaction mixture was agitated at 30° C. for 19 hours. At the end of this time the polymerization was stopped by adding 8 parts of ethanol. The modified magnesium compound was removed by diluting the reaction mixture with ether, washing it twice with 3% aqueous hydrogen chloride (stirring for one hour for each wash), washing it with water until neutral, washing it twice with 10% aqueous sodium hydroxide and again washing it with water until neutral.

One-fifth (⅕) of the product was stabilized with 0.5% Santonox and dried. The residue was fractionated by recrystallization from a 1% solution in acetone at −18° C. to give a fraction amounting to 8% of the total of an acetone-insoluble copolymer which was a strong, snappy rubber having an RSV of 15.9 and moderate crystallinity by X-ray. The acetone-soluble fraction amounted to 90% of the total, had an RSV of 6.2 and by analysis (Kemp Br. No.) contained 11.6% allyl glycidyl ether.

The other four fifths of the product was stabilized with 1% phenyl β-naphthylamine and dried. The total conversion was 51%. This copolymer had an RSV of 9.0 and by X-ray was largely amorphous.

EXAMPLE 17

A water modified magnesacyclonoa-3,7-diene complexed with diethyl ether was prepared as described in Example 1 using 0.33 part of magnesacyclonoa-3,7-diene with 1.0 mole of water per mole of magnesium. The resulting product was tested for activity in polymerizing ethylene oxide as described in Example 1. A high yield and high conversion of ether-insoluble poly(ethylene oxide) was obtained.

What I claim and desire to protect by Letters Patent is:

1. A catalyst composition consisting essentially of (1) a modified halogen-free organomagnesium compound and (2) at least one liquid diluent selected from the group consisting of (a) inert hydrocarbon compounds and (b) complexing agents for the modified organomagnesium compound, said modified organomagnesium compound comprising the reaction product of a halgen-free organomagnesium compound of the formula R—Mg—R′ wherein R is a hydrocarbon radical and R′ is a substituent selected from the group consisting of hydrogen, R and —OR with at least one polyreactive compound selected from the group consisting of water, aliphatic hydrocarbon polyols, cycloaliphatic hydrocarbon polyols and polyhydric phenols in an amount such that the equivalent mole ratio of polyreactive compound to magnesium compound is within the range of from about 0.01 to about 0.7 and such that said modified organomagnesium compound retains from about 0.2 to about 1.8 of the magnesium-to-carbon bonds present in the oragnomagnesium compound so reacted, said complexing agents being selected from the group consisting of dialkyl ethers, ethers, araliphatic ethers, araliphatic mixed ethers, non-aromatic tertiary amines, mixed aliphatic-aromatic tertiary dioxane, tetrahydrofuran and trialkylmonoamines.

2. The catalyst composition of claim 1 wherein the halogen-free organomagnesium compound is a dialkylmagnesium.

3. The catalyst composition of claim 1 wherein the polyreactive compound is a polyhydric phenol.

4. The catalyst composition of claim 1 wherein the polyreactive compound is an alkylene glycol.

5. The catalyst composition of claim 1 wherein the polyreactive compound is water.

6. The catalyst composition of claim 3 wherein the polyreactive compound is resorcinol.

7. The catalyst composition of claim 2 wherein the modified organomagnesium compound is complexed with diethyl ether.

8. The process of preparing the catalyst composition of claim 1 which comprises reacting a solution of a halogen-free organomagnesium compound of the formula R—Mg—R′ wherein R is a hydrocarbon radical and R′ is a substituent selected from the group consisting of hydrogen, R and —OR in an organic solvent therefor with at least one polyreactive compound selected from the group consisting of water, aliphatic hydrocarbon polyols, cycloaliphatic hydrocarbon polyols and polyhydric phenols in an inert atmosphere in an equivalent mole ratio of polyreactive compound to magnesium compound of from about 0.01 to about 0.7.

References Cited
UNITED STATES PATENTS

| | | | |
|---|---|---|---|
| 3,337,475 | 8/1967 | Fukui et al. | 252—431 NX |
| 3,480,567 | 11/1969 | Matsui et al. | 252—431 RX |
| 3,520,849 | 7/1970 | Vandenberg | 252—431 RX |
| 3,536,634 | 10/1970 | Vandenberg | 252—431 RX |
| 3,655,586 | 4/1972 | Vanderberg | 252—428 X |
| 3,657,158 | 4/1972 | Vandenberg | 252—431 RX |

PATRICK P. GARVIN, Primary Examiner

U.S. Cl. X.R.

252—431 N; 260—2 A, 665 R

PO-1050
(5/69)

UNITED STATES PATENT OFFICE
CERTIFICATE OF CORRECTION

Patent No. 3,766,091      Dated October 16, 1973

Inventor(s)   Edwin J. Vandenberg

It is certified that error appears in the above-identified patent and that said Letters Patent are hereby corrected as shown below:

Column 7, Table V, the values for each of the columns in the first line of the table for Example 11 should read -- 0.3, 80, 80, 24, 100, 0 --.

In the Claims, Claim 1, Column 10, lines 15, 16 and the first word in line 17 should be deleted, that is, -- ethers, araliphatic ethers, araliphatic mixed ethers, nonaromatic tertiary amines, mixed aliphatic-aromatic tertiary --.

Signed and sealed this 19th day of February 1974.

(SEAL)
Attest:

EDWARD M. FLETCHER, JR.
Attesting Officer

C. MARSHALL DANN
Commissioner of Patents